Jan. 15, 1963  R. M. McDONALD  3,074,005
VOLTAGE REGULATOR FOR GENERATORS
Filed June 21, 1960
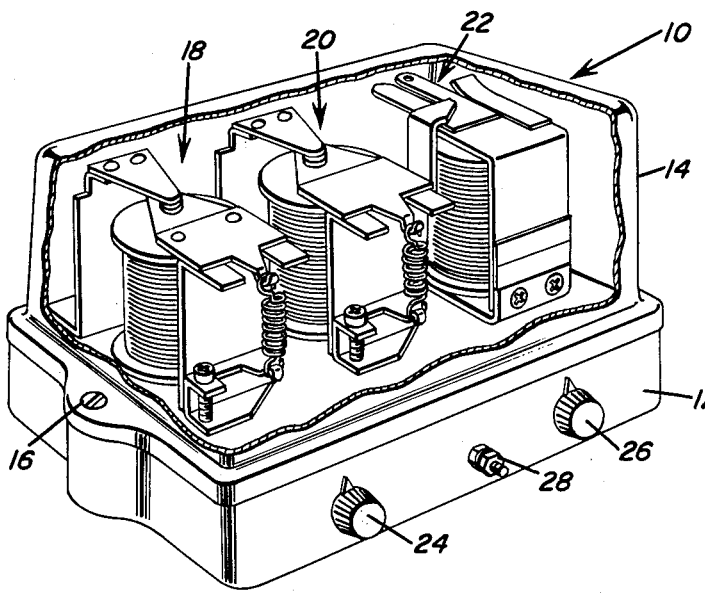
Fig. 1
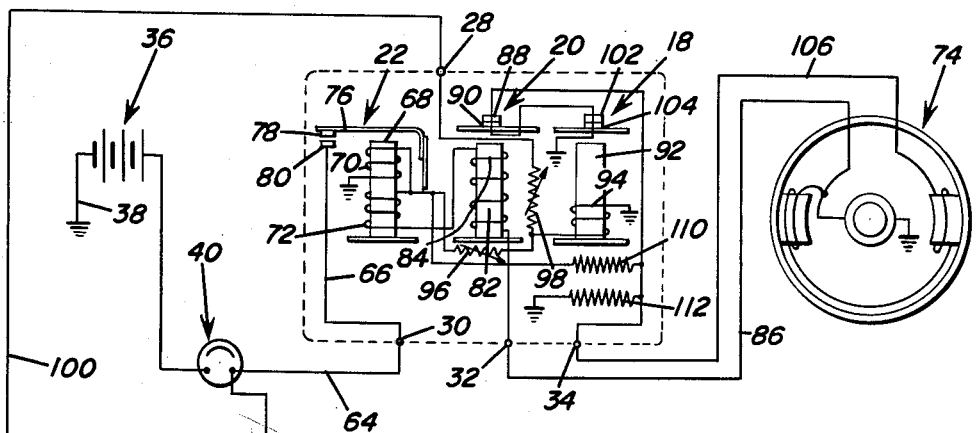
Fig. 2
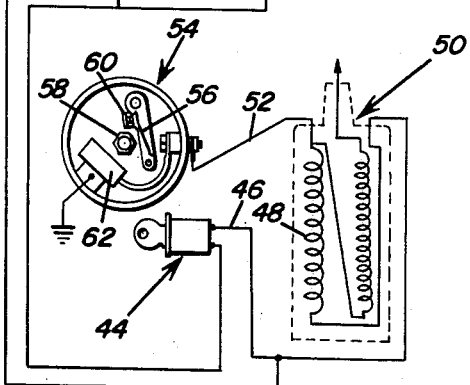
Russell M. McDonald
INVENTOR.
BY *Clarence A. O'Brien*
*and Harvey B. Jacobson*
Attorneys

United States Patent Office 3,074,005
Patented Jan. 15, 1963

3,074,005
VOLTAGE REGULATOR FOR GENERATORS
Russell M. McDonald, 1002 College Ave., Conway, Ark.
Filed June 21, 1960, Ser. No. 37,650
9 Claims. (Cl. 322—84)

This invention relates generally to battery ignition system equipment and more particularly to a novel regulator incorporating improved voltage regulating characteristics.

Conventional regulator arrangements have been proven to be reasonably satisfactory for most uses as in automobiles and boats employed under normal operating conditions. However, certain battery ignition systems require a greater than normal generator output to maintain the battery charged. For example, only, cars equipped with two-way radios or air conditioning often present a considerably battery drain while offering insufficient generator activity to maintain the battery at its proper charge level. Heavy duty generators are often employed in vehicles which has a greater than normal battery drain. The use of these generators somewhat overcomes the effects of the drain. However, where there is insufficient vehicle activity, even the use of a heavy duty generator will often prove to be insufficient. In view of this, it is the principal object of this invention to provide an improved regulator having advanced voltage regulating characteristics which operate automatically to increase the generator charging rate at a lower r.p.m. speed of the generator and automatically lower the generator charging rate at a higher r.p.m. speed. The change from the lower charging rate of the generator to the higher charging rate of the generator is governed by battery condition as well as increased generator speed. Moreover, the improved regulator is also more sensitive to battery needs than conventional type regulators.

The improved regulator provided herein is adapted for utilization with battery ignition systems regardless of where employed. The battery ignition systems always make use of batteries feeding ignition coils connected to distributors, the cams of which distributors revolve at a speed directly proportional to the r.p.m. of a generator, which is connected to the battery through a regulator for maintaining the charge of the battery at a satisfactory level. The conventional regulators utilize a voltage regulator unit wherein a shunt winding is disposed on a core so as to operate an armature carrying a contact point engageable with a stationary contact point. Springs generally hold the armature away from the core so that the points are in contact. The points are electrically connected in the generator field circuit and therefore when the shunt winding is not energized or insufficiently energized, the generator field circuit is completed through the contacted points to ground. When the shunt winding is sufficiently energized, the points are open so as to insert resistance into the generator field circuit for reducing the generator field current and voltage. The invention contemplates the provision of a variable resistance between the primary winding of the ignition coil on the battery side and the voltage regulator shunt winding. A manual control extends from the regulator housing enabling the variable resistance to be easily varied. At low generator speeds, therefore, the shunt winding will be insufficiently energized to open the contacts and place a resistance in the generator field circuit and therefore the charging rate will be high. At higher generator speeds, the distributor breaker points will open and close more rapidly, permitting the distributor breaker points to remain in contact for a shorter period of time, which increases the voltage on the battery side of the primary winding of the ignition coil. This increase in the voltage on the battery side of the primary winding of the ignition coil serves to increase the voltage at the voltage regulator shunt winding and thereby opens the contact points so as to place a resistance in the generator field circuit and reduce the generator charging rate.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a perspective view partially broken away of a regulator housing and the cutout relay unit, current regulator unit, and voltage regulator unit disposed therein; and FIGURE 2 is a schematic wiring diagram showing the manner in which the conventional regulator may be modified to incorporate the teachings of this invention.

With continuing reference to the drawings the numeral 10 generally represents a regulator construction including a two piece housing comprising a base 12 and a cover 14. The base 12 and cover 14 are secured together by fasteners 16. Supported on the base 12 beneath the cover 14 is a voltage regulator unit 18, a current regulator unit 20, and a cutout relay unit 22. The base 12 has disposed thereon a pair of manual controls 24 and 26 utilized to control variable resistances, not shown in FIGURE 1, to be more particularly described below. A terminal 28 extends from the base 12 and is, in addition to the three conventional battery, generator, and field terminals, illustrated by the numerals 30, 32 and 34, respectively, in FIGURE 2.

Two unit and three unit regulators are well known to those persons skilled in the art. The two unit regulators include a cutout relay unit and a voltage regulator unit while the three unit regulator has, in addition, a current regulator unit. Although the explanation following is made in conjunction with a three unit regulator, it is to be understood that the teachings are applicable to a two unit regulator.

A battery 36 is grounded at one terminal 38 while a second terminal is connected to an ammeter 40 and thence to an ignition circuit through conductor 42 and an ignition switch 44. Conductor 46 extends from the ignition switch 44 to the primary winding 48 of coil 50. A conductor connects the secondary to the distributor. The conductor 52 from the primary 48 is connected to breaker point 56 of the interrupter 54 which is intermittently moved by engine driven cam 58 into and out of engagement with stationary grounded contact 60. Condenser 62 is connected in parallel with the points 56 and 60 for arc preventing purposes. Conductor 64 extends from the ammeter 40 to terminal 30 on the base 12. The terminal 30 extends through conductor 66 to the cutout relay unit 22. The relay unit 22 is provided with a core 68 upon which is wound a shunt winding 70 for grounding the charging circuit when disconnected from the battery and a series winding 72. The shunt winding 70 is shunted across the generator 74 so that generator voltage is impressed upon it at all times. The series winding 72 is connected in series with the charging circuit to the batteries so that generator output passes through it. A flat steel armature 76 is disposed above the core 68 and is responsive to energization of the unit 22. The armature 76 carries a contact 78 adapted to engage contact 80 for connecting the series winding 72 to conductor 66, and thence to battery 36.

The current regulator unit 20 includes a core 82 around which extends the series winding 84 connected to terminal 32. Conductor 86 connects terminal 32 to the armature of generator 74. The core 82 of the current regulator unit operates to open contacts 88 and 90 when current is flowing in the series winding 84 in excess of the current regulator setting in order to increase the field resistance and thereby limit the generator output current. The voltage regulator unit 18 constitutes a magnetic switch device and includes a core 92 having a shunt winding 94 wound thereon. The conventional shunt winding 94 is shunted across the generator so that the generator voltage is impressed on it at all times. In accordance with the teachings of this invention, the shunt winding 94 is connected in series with an adjustable resistor 96 across the generator to selectively reduce voltage applied by the generator to the shunt winding 94 in order to boost the regulated voltage of the generator. Also, an adjustable resistance or impedance 98 is connected to the shunt winding 94 in parallel with the ignition circuit through conductor 100 connected to conductor 46 on the battery side of the primary winding of the coil 50 for introducing a speed and battery load demand influence. The voltage regulator unit 18 therefore includes stationary contact 102 and contact 104 which is movable out of engagement with the contact point 102 when the shunt winding 94 is sufficiently energized in order to increase the fields resistance of the generator. Conductor 106 extends from the field winding of the generator 74 to the terminal 34 and thence through the contacts 88 and 90 through the contacts 102 and 104 to ground. Resistances 110 and 112 are connected to the conductor 106 extending from the generator field circuit for becoming connected in parallel therewith when the current regulator operates. Conventional cutout relay action involves the closing of contact points 78 and 80 when the generator voltage builds up to a value sufficient to charge the battery to complete the charging circuit. The contacts 78 and 80 are closed under the influence of the shunt winding 70 and series winding 72. Conventionally when the generator slows down to reduce the output thereof below the battery potential or stops, current begins to flow from the battery to the generator and the reverse flow in series windings 72 opposes the effect of the shunt winding 70 and the contacts 78 and 80 open. The current regulator action is for the purpose of inserting resistance 112 into the generator field circuit by opening the contacts 88 and 90 when the current load demand is heavy. The voltage regulator unit 18 may not under such conditions be operative to insert the resistance in the field circuit and therefore the current regulator unit provides an additional control to reduce the generator output when it has reached its maximum. The voltage regulator unit 18 is provided so that when the generator voltage reaches the value for which the voltage regulator is adjusted, the magnetic field produced by the shunt winding overcomes the spring tension maintaining the contacts 102 and 104 closed so that the contact points become separated to insert resistance 112 in the generator field circuit to reduce the generator field current and the voltage.

The invention herein concerns the utilization of the variable resistors 96 and 98 connected to the shunt winding 94 of the voltage regulator unit 18. The variable resistors 96 and 98 are controlled externally by the manual controls 24 and 26. It will be appreciated that by utilizing the variable resistances 96 and 98 in series with the shunt winding 94, that when the generator 74 is charging at a lower r.p.m., the charging rate thereof will be greater inasmuch as the resistances 96 and 98 tend to reduce the supply of energizing current to the shunt winding 94 to prevent development of sufficient magnetic pull in the core 92 to open the contact points 102 and 104 to insert resistance in the generator field circuit. When, however, the generator 74 is turning at a higher r.p.m., the breaker points 56 and 60 of the interrupter 54 will open and close at a much faster rate so as to allow the potential applied to conductor 46 to increase whereby the voltage in conductor 100 and terminal 28 will increase. The higher voltage at this higher r.p.m. of the generator will increase the current supplied to the shunt winding 94 of the voltage regulator unit 18 thereby opening the contacts 102 and 104 to insert resistance in the generator field circuit thereby lowering the generator charging rate. The potential developed between the battery and the ignition circuit being dependent on the speed influenced demand of the ignition coil on the battery as well as the condition of the battery, will thereby provide a speed and battery condition controlling influence on the operation of the shunt winding 94 through the adjustable impedance 98.

It will therefore be appreciated that the use of regulator constructions in accordance with the teachings herein allow for the simple control of the resistances 96 and 98 from the manual controls 24 and 26 outside the regulator housing. The manual controls allow the regulator therefore to be set under the operating conditions indicated so that the generator charging rate is at a maximum when the generator is moving at a low r.p.m. speed for assuring proper charging in vehicles equipped with two-way radios, air conditioning, etc. When the generator speed increases, this higher generator charging rate is no longer necessary and the generator charging rate accordingly automatically falls off.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a battery ignition system including a battery, a generator operatively connected by a charging circuit to said battery, a distributor coil operatively connected to the battery, a regulator having a cutout relay unit and voltage regulator unit including a shunt winding operatively connected to said charging circuit for supplying battery condition responsive current thereto; the improvement comprising a variable resistor conductively connected between said shunt winding and the battery side of the primary winding of said ignition coil for variably increasing the supply of current to the shunt winding in accordance with generator speed and battery demand.

2. For use in a battery ignition system including a generator operatively connected by a charging circuit to a battery connected to the primary winding of an ignition coil, an improved regulator comprising a cutout relay unit and a voltage regulator unit, each of said units including shunt windings shunted across said generator by connection to said charging circuit, and a first variable resistance electrically connected continuously in series with said voltage regulator shunt winding across said generator to provide a battery condition control over the voltage regulator unit.

3. For use in a battery ignition system including a generator operatively connected by a charging circuit to a battery connected to the primary winding of an ignition coil, an improved regulator comprising a cutout relay unit and a voltage regulator unit, each of said units including shunt windings shunted across said generator by connection to said charging circuit, and a first variable resistance electrically connected continuously in series with said voltage regulator shunt winding across said generator to provide a battery condition control over the voltage regulator unit, and a second variable resistance connected between said voltage regulator shunt winding and the battery side of said primary winding for variably increasing the supply of current to the shunt winding in accordance with generator speed and battery demand.

4. For use in a battery ignition system including a generator operatively connected by a charging circuit to a battery connected to the primary winding of an ignition coil, an improved regulator comprising a cutout relay unit and a voltage regulator unit, each of said units including shunt windings shunted across said generator by connection to said charging circuit, and a first variable resistance electrically connected continuously in series with said voltage regulator shunt winding across said generator to provide a battery condition control over the voltage regulator unit, and a second variable resistance connected between said voltage regulator shunt winding and the battery side of said primary winding for variably increasing the supply of current to the shunt winding in accordance with generator speed and battery demand, a regulator housing, and manual controls operatively connected to said variable resistances extending from said housing.

5. For use in a battery ignition system including a generator operatively connected by a charging circuit to a battery connected to the primary winding of an ignition coil, an improved regulator comprising a cutout relay unit and a voltage regulator unit operatively connected to said charging circuit for supplying battery condition responsive current thereto, each of said units including shunt windings shunted across said generator by connection to said charging circuit, and a variable resistance connected between said voltage regulator shunt winding and the battery side of said primary winding for variably increasing the supply of current to the shunt winding in accordance with generator speed and battery demand.

6. For use in a battery ignition system including a generator operatively connected by a charging circuit to a battery connected to the primary winding of an ignition coil, an improved regulator comprising a cutout relay unit and a voltage regulator unit operatively connected to said charging circuit for supplying battery condition responsive current thereto, each of said units including shunt windings shunted across said generator by connection to said charging circuit, and a variable resistance connected between said voltage regulator shunt winding and the battery side of said primary winding for variably increasing the supply of current to the shunt winding in accordance with generator speed and battery demand, a regulator housing, and a manual control operatively connected to said variable resistance extending from said housing.

7. The combination of claim 6 wherein said generator defines a field circuit, an electrical resistance adapted to be connected in said field circuit in response to energization of said voltage regulator shunt winding, said manual controls being operable to adjust said variable resistance whereby the voltage drop across said voltage regulator shunt winding is insufficient to place said resistance in said field circuit at low generator speed.

8. For use in an automotive battery charging system mounted on an automobile having a primary ignition circuit and a magnetic switching device controlling the field impedance of a charging generator for regulating the output voltage thereof, a device for substantially inhibiting operation of said magnetic switch device at low generator speeds comprising, an adjustable resistance device continuously connected in series relation with a shunt winding of said magnetic switching device to reduce the voltage applied thereto for adjustably boosting the regulated voltage of the generator, and variable controlling means connected in series relation to the shunt winding continuously operative for varying the current supplied to said shunt winding in accordance with generator speed and battery condition.

9. The combination of claim 8, wherein said variable controlling means comprises an impedance device connected to the battery in parallel with the primary ignition circuit for controllably conducting current influenced by both the ignition circuit demand and generator charging of the battery.

References Cited in the file of this patent
UNITED STATES PATENTS

| | | |
|---|---|---|
| 2,221,586 | Kovalsky | Nov. 12, 1940 |
| 2,422,925 | Rady et al. | June 24, 1947 |
| 2,697,175 | McDonald | Dec. 14, 1954 |